April 14, 1959

G. H. MUSSELMAN 2,882,526

CYCLE MATCHING RECEIVER

Filed May 10, 1946

INVENTOR
GLENN H. MUSSELMAN

BY

ATTORNEY

United States Patent Office 2,882,526
Patented Apr. 14, 1959

2,882,526

CYCLE MATCHING RECEIVER

Glenn H. Musselman, Natick, Mass., assignor, by mesne assignments, to the United States of America as represented by the Secretary of the Navy Application May 10, 1946, Serial No. 668,703

11 Claims. (Cl. 343—103)

This invention relates to a position indicating system, and more particularly to apparatus for receiving and indicating timed pulses from radio transmitting stations of known position.

A long range navigation system which enables a navigator to locate himself on the surface of the earth is disclosed and claimed in the copending application of Jabez C. Street, John A. Pierce, and Donald E. Kerr, Serial No. 599,163, filed June 13, 1945, now Patent No. 2,689,346, on "Long Range Navigation System." Broadly, this system comprises a plurality of pairs of pulse transmitters spaced at known positions, each transmitter radiating pulses which bear a fixed time relationship with pulses radiated by the other transmitter comprising the pair. The navigator has apparatus which receives these pulses and indicates the difference in the propagation times of pulses from paired transmitters. With this information, and knowledge of the fixed time relationship between paired pulses, a location may be established along spherical hyperbolas having their foci at respective pairs of transmitters. The intersection of these hyperbolas will fix the position of the navigator. In practice, charts of the area served by the transmitters are prepared for the navigator's use. These charts have plotted thereon the family of spherical hyperbolas corresponding to each pair of transmitters, the hyperbolas plotted being chosen to correspond to some predetermined time difference. Using these charts, the navigator has only to measure the arrival time difference of the corresponding pulses from each pair of transmitters and then determine his position by interpolating the distance between the two hyperbolas nearest to the measured difference in arrival time.

For applications where a high degree of accuracy is desirable the charts can be expanded, the time difference between adjacent hyperbolas being reduced to a practicable minimum. An important limiting factor in the accuracy of the indication, however, lies in the matching of pulses from a pair of transmitters, such matching being one of the steps in the determination of arrival time difference. Present systems use a conventional superheterodyne receiver, wherein signals picked up by the receiving antenna are amplified and converted to an intermediate frequency, and, when built up to an amplitude of several volts, rectified by a diode detector. The signals are then amplified again as a detected pulse and applied to the vertical deflection plate or plates of a cathode ray tube. The rise time of the detected pulses becomes an important consideration where very accurate time differences are desired. Since it is technically inconvenient to decrease the rise time below certain values, the precision with which two pulses may be matched reaches a limit under the above system.

It is, therefore, the object of the present invention to provide apparatus for improving the accuracy of the above described navigation system.

An object is to provide apparatus in a receiver of the loran type for matching individual cycles of intermediate frequency signals derived from pulse modulated radio frequency energy radiated from a pair of remote transmitters.

A further object is to provide apparatus for more accurate pulse matching.

It is another object to provide apparatus in a receiver of the loran type for matching corresponding individual cycles of two radio frequency signals derived from the radio frequency components of pulses radiated from a pair of remote transmitters.

It is also an object to provide apparatus in a receiver of the loran type for determining the difference in arrival time of two pulses of radio frequency energy by matching individual cycles of the undetected pulses.

These and other objects will be more apparent upon consideration of the following specification, taken with the accompanying drawings, forming a part thereof, in which.

Briefly, in the present embodiment the radio frequency pulses are amplified at 10, and converted to an intermediate frequency in mixer 11, the heterodyning signal being supplied from local oscillator 12. The resulting intermediate frequency signal is amplified at 13, and, in the steps in the matching process wherein the fast sweeps are used, this intermediate frequency signal is passed directly on to video amplifier 14 and then applied to the vertical deflection plate of cathode ray tube 15. The individual cycles of the intermediate frequency pulse are now matched, their relatively short rise time allowing the use of a faster sweep with a proportional increase in accuracy.

Since the basic improvement in the present apparatus over previous receiving and indicating equipment lies in applying the undetected pulse directly to the cathode ray tube, it is apparent that either a superheterodyne or a tuned radio frequency receiver may be employed. The superheterodyne technique has been used in the present embodiment because it provides a receiver with high grain without the prevalent feed back difficulties of the tuned radio frequency type of receiver. An important consideration in the use of the superheterodyne technique, however, is that the intermediate frequency signal has an instantaneous phase which is related to the instantaneous phase of both the incoming signal and the heterodyning voltage. If the heterodyning voltage undergoes random phase gyrations the pattern of cycles appearing on the cathode ray tube will also be shifting about in phase. It is apparent, then, that the local oscillator must be kicked into some particular phase for the period during which the cyclic matching is accomplished.

Figure 2:
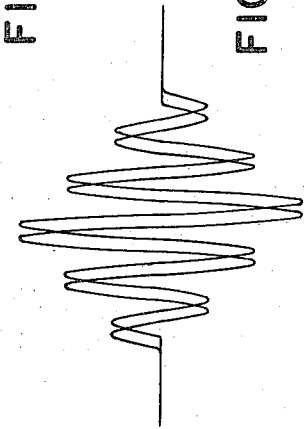
Fig. 2 is a representation of the cathode ray tube indication resulting from use of the present embodiment.

The method used in the present embodiment is to pulse the local oscillator on just previous to the start of the fast sweep. This insures proper injection phase when the pulses are matched because when the pulses are superimposed they are, of necessity, each the same distance from the start of the sweep. Until the pulses are accurately matched, however, they may experience a different injection voltage phase. Thus, as the fine delay control is operated to bring the pulses into superposition, the picture, as shown in Fig. 2, does not move horizontally, but rather, screws its way horizontally (due to the changing phase of the heterodyne voltage) thus making it more difficult to match the proper cycles. Once the proper cycle has been determined, however, this effect makes it easier to accurately match the two pulses by producing an effective magnification of improper matching. For example, if we change the delay (the relative position of one pulse with respect to the second pulse)

by an amount equal to one-half the period of the R.-F. signal, the I.-F. will be changed one-half period also, with the result that we get an apparent magnification of the ratio of $$\frac{R.-F.}{I.-F.}$$

for slightly improper matching.

Taking a concrete example, using a radio frequency of 180 kc. and an intermediate frequency of 50 kc., the apparent magnification is 3.6, with the result that if the pulses are matched to within 2 microseconds (right cycles determined but not quite superimposed), the screwing or phase effect puts the two cycles about 7.2 microseconds apart. From point of view of net result, however, this neither adds nor substracts from the exact accuracy or ability to pick the right cycles as compared to use of a tuned radio frequency receiver. This is true because although the peaks of the cycles move 3.6 times as fast as the delay is moved, the slope of the intermediate frequency signal is 1/3.6 times the slope of the radio frequency signal. Consequently, the exact intermediate frequency is not important as far as matching accuracy is concerned.

Figure 1:
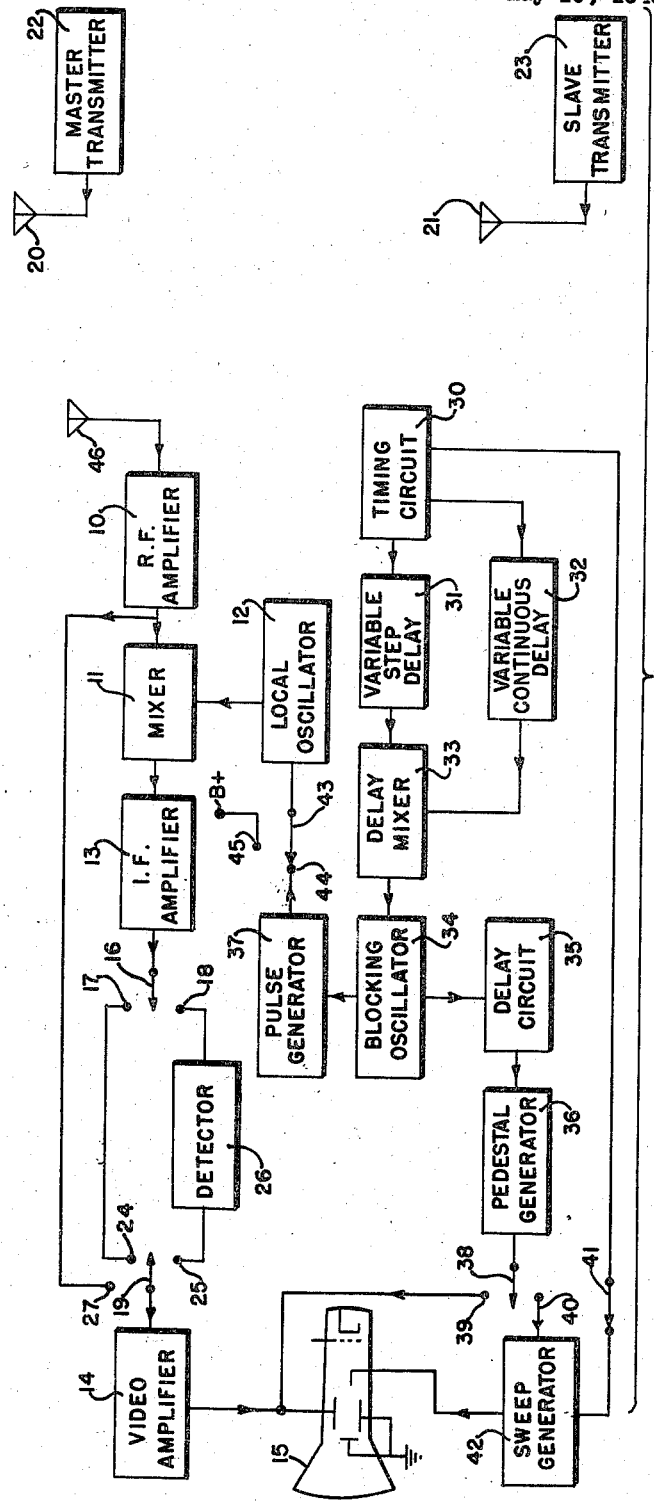
Fig. 1 is a block diagram of one embodiment of the invention.

Referring more specifically to Fig. 1, radio frequency pulses, as emitted by antennas 20 and 21 of master transmitter 22 and slave transmitter 23 respectively, are picked up by antenna 46 at the navigator's receiving and indicating equipment. To continue using the frequencies previously cited, the received signals may be made up of a pulse-modulated 180 kc. radio frequency signal. These pulses are amplified at 10 and applied to mixer 11, which heterodynes them with a signal voltage from local oscillator 12. The local oscillator operates at 130 kc. in the present embodiment, differing from 180 kc. by the intermediate frequency of 50 kc. On the slow sweep the local oscillator operates continuously, but it is pulsed into operation on the fast sweeps by a timing mechanism which will be described later in the specification.

The 50 kc. intermediate frequency signals are amplified at 13 and, on the slow sweep, applied through switch 16, contacting terminal 18, to detector 26. The signals are herein rectified, and the pulse envelope applied through terminal 25 of switch 19 to video amplifier 14. On the fast sweeps the intermediate frequency pulses are applied through switch 16 (terminal 17) and switch 19 (terminal 24) directly to video amplifier 14. The output of video amplifier 14 is applied to the vertical deflection plate of cathode ray tube 15.

Local oscillator 12 is pulsed on just previous to the start of the fast sweeps, thereby locking the phase of the heterodyning voltage to the start of the sweep. The oscillator is turned on before the sweep starts so that transients at the intermediate frequency, arising from the sudden application of voltage to the oscillator tube, will not obscure the scope indication. Timing circuit 30 may be comprised of a crystal controlled oscillator, frequency divider circuits, and a square wave generator operating at the desired pulse repetition frequency. Timing circuit 30 starts the operation of variable step delay 31, and, one half cycle later, the operation of variable continuous delay 32. These variable delays are used to position pedestals which constitute short sections of the cathode ray trace displaced vertically and upon which the received pulses are mounted (on the slow sweep). On the fast sweeps a sweep is generated only during the pedestal interval, and adjustments in the matching process are made by changing the variable continuous delay.

The outputs of delay circuits 31 and 32 are mixed in delay mixer 33 and a trigger coincident with the end of each delay period produced in blocking oscillator 34. These triggers fire pulse generator 37, which turns on the local oscillator for fast sweep operation, switch 43 being then closed to terminal 44. On the slow sweep switch 43 is closed to terminal 45, to which is applied B+ voltage so the oscillator operates continuously.

The triggers from blocking oscillator 34 are also applied to delay circuit 35, the delayed output firing pedestal generator 36. On the slow sweep the pedestals are applied through switch 38 (terminal 39) directly to cathode ray tube 15. A linear sweep is provided by sweep generator 42, which in this case is synchronized by timing circuit 30, switch 41 being closed. On the fast sweeps the pedestals are applied through switch 38 (terminal 40) to sweep generator 42, which produces a fast sweep during the pedestal interval, switch 41 now being open. In this manner the local oscillator is turned on previous to, but synchronized with the start of the fast sweeps. The scope indication on the fast sweep, before matching has been completed, appears as represented in Fig. 2.

It will be appreciated that in the alternative case where the radio frequency amplifier is of the tuned frequency type, there is no need to resort to the phase coherency provision of Fig. 1. Consequently, the apparatus necessary to carry out the cycle-by-cycle matching can be relatively simple and can take the form of a second channel from the amplifier 10 directly to a third contact 27 of rotary switch 19. Thus, the output of the tuned amplifier is directly fed to the video amplifier 14 for a further stage of signal amplification and then to the appropriate deflecting electrodes of the cathode ray tube indicator 15.

It is obvious that if the accuracy advantage of the present invention is utilized at some point in the service area, the receivers located at the transmitting stations would also have to be capable of measuring the time difference of the pulses on a cycle matching basis. Also, the pulse shape as emitted by the transmitting antennas must be carefully maintained so that it is feasible to match the appropriate cycles in paired pulses.

Another advantage inherent with the above described cycle matching principle, regardless of whether a superheterodyne or tuned radio frequency type of receiver is used, is that large bursts of noise do not cause overloading of the type which produces sudden changes in the bias and screen voltages of the video stages. Instead, a symmetrical type of burst occurs which allows the scope trace to recover immediately after the burst has stopped, thereby causing much less vertical shifting of the traces due to noise peaks. This is particularly advantageous when working under conditions of low signal-to-noise ratio.

Although the invention has been disclosed in a particular embodiment, it will be obvious to one skilled in the art that many changes may be made in the circuits disclosed without departing from the spirit of the invention, as sought to be defined in the following claims.

What is claimed is:

1. Receiving apparatus for a long range navigation system comprising, antenna means, radio frequency amplifying means connected to said antenna means, mixing means connected to the output of said amplifying means, a local oscillator connected to said mixing means, means for pulsing said local oscillator into operation at a predetermined repetition rate, adjustable means controlling the time at which said local oscillator is pulsed into operation, intermediate frequency amplifying means connected to the output of said mixing means, a detector, video amplifying means, switching means permitting connection of the output of said intermediate frequency amplifying means to said detector, switching means permitting connection of the output of said detector to said video amplifying means, switching means permitting connection of the output of said intermediate frequency amplifying means to said video amplifying means, a cathode ray tube connected to said video amplifying means, means for causing the beam of said cathode ray tube to sweep at a first and a second speed, and means for selecting said first or second sweep speed.

2. Apparatus for measuring the time difference between radio frequency pulses of each of two synchronized recurrent series of pulse emissions comprising, antenna means, means connected to said antenna means for amplifying the radio frequency pulses so received, a local oscillator, means for controlling the operating time of said local oscillator, means for mixing said amplified radio frequency pulses and the output of said local oscillator, means for amplifying the resulting intermediate frequency pulses, a detector, a video amplifier, means adapted to switch the amplified intermediate frequency pulse to said video amplifier, means adapted to switch the amplified intermediate pulse through said detector to said video amplifier, a cathode ray tube connected to the output of said video amplifier, and means for superimposing the individual cycles of said pulses, whereby the difference in arrival time of said pulses is determined.

3. Apparatus for measuring the time difference between the arrival of radio frequency pulses of each of two recurrent series of pulse emissions, comprising means for receiving said two series, means for driving cyclical signals from the radio frequency components of discrete pulses of each of said series, means for concurrently displaying cyclical signals derived from said two recurrent series of pulse emissions, and means for comparing the arrival time of the pulses of one of said two recurrent series with the arrival time of the pulses of the other of said two recurrent series by matching said cyclical signals.

4. Apparatus for measuring the time difference between the arrival of radio frequency pulses of each of two recurrent series of pulse emissions, comprising means for receiving said two series, a local oscillator, means for mixing said two series with the output of said local oscillator to derive intermediate frequency pulses, means for concurrently displaying individual cycles of the intermediate frequency pulses derived from said two recurrent series of pulse emissions, and means for matching corresponding individual cycles of the concurrent display to ascertain said time difference between the arrival of pulses of two recurrent series of pulse emissions.

5. Apparatus as in claim 4, means for pulsing said local oscillator into operation at a predetermined repetition rate, and adjustable means for controlling the time of initiating oscillations in said local oscillator.

6. Apparatus as in claim 4, including a detector and a switching device for permitting display of said intermediate frequency pulses in detected or undetected form.

7. In an object position indicating system responsive to pulse modulated radio frequency energy received from a remote spaced pair of synchronized transmitters, apparatus for determining the position of said object comprising, means for receiving said pulse modulated radio frequency energy from said transmitters, a cathode ray tube, means to deflect the beam of said cathode ray indicator in a horizontal sweep, means for amplifying said pulse modulated radio frequency energy, means for applying the amplified pulses of radio frequency energy to said cathode ray indicator to deflect the beam thereof vertically, thereby displaying the cycles of pulsed radio frequency energy from one of said pair of transmitters on a first horizontal sweep and the cycles of radio frequency energy pulses from the second of said pair of transmitters on a second horizontal sweep, and means for adjusting the time of initiation of said first and second horizontal sweeps to superimpose individual radio frequency cycles of said radio frequency pulses.

8. In a radio navigation system for indicating the position of a moving craft in response to pairs of time spaced series of radio frequency pulses radiated from paired spaced remote transmitters, receiving apparatus carried by said craft comprising, means for receiving said pulses from said pair of transmitters, a local oscillator, means for mixing said received pulses with the output of said local oscillator to derive pulses of energy at an intermediate frequency, a cathode ray indicator, means for applying said intermediate frequency pulses to said cathode ray indicator to deflect the beam thereof vertically in accordance with the cyclic alternating voltage of said intermediate frequency pulse, means to deflect the beam of said cathode ray indicator in horizontal sweeps, means to adjust the times of initiation of alternate horizontal sweeps to superimpose individual cycles at said intermediate frequency of corresponding pairs of pulses, and means to energize said local oscillator in a predetermined time relationship to the initiation of said horizontal sweeps.

9. In a radio navigation system for indicating the position of a moving craft in response to pairs of time spaced radio frequency pulses radiated from paired spaced transmitters in recurrent series having a constant pulse repetition rate, receiving apparatus carried by said craft comprising, means for receiving said pulses from said pair of transmitters, a local oscillator, means for mixing said received pulses with the output of said local oscillator to derive pulses of energy at an intermediate frequency, means for amplifying pulses at said intermediate frequency, a cathode ray indicator, means for applying said amplified intermediate frequency pulses to said cathode ray indicator to deflect the beam thereof vertically in accordance with the cyclic alternating voltage of said intermediate frequency pulse, means to deflect the beam of said cathode ray indicator in horizontal sweeps, means to adjust independently the times of initiation of alternate horizontal sweeps to superimpose individual cycles at said intermediate frequency of corresponding pairs of pulses, and means to energize said local oscillator in a predetermined time relationship to the initiation of said horizontal sweeps.

10. Apparatus for measuring the difference in time of arrival of first and second time spaced series of regularly recurring pulse emissions from a pair of spaced remotely located transmitters comprising, a cathode ray tube, a time circuit for generating a train of voltage pulses having a pulse repetition rate equal to the repetition rate of said pulse emissions, a slow sweep generator responsive to said train of pulses to produce a pair of electron beam sweeps on said cathode ray tube, means for receiving said first and second series pulses, a local oscillator, means for mixing said two series of received pulses and the output of said local oscillator to produce pulses at an intermediate frequency, means to rectify said intermediate frequency pulses and to display the pulse envelope of each series of pulses on a separate one of said pair of sweeps, means for generating a series of pedestal pulses and operative to display a pedestal pulse on each of said sweeps, means for adjusting the position of said pedestal pulses on said sweeps so that the pulse envelopes of said two series of emission pulses are displayed at the same position on their respective pedestal pulses, a fast sweep generator responsive to each of said pedestal pulses for producing electron beam sweeps on said cathode ray tube of a duration substantially equal to said pedestal pulses, means for substituting said fast sweep generator for said slow sweep generator and for applying said pulses of intermediate frequency directly to said cathode ray indicator for displaying thereon, whereby individual cycles of intermediate frequency energy of said first and second series may be superimposed by adjustment of said pedestal pulse position.

11. Apparatus for measuring the difference in time of arrival of first and second time spaced series of regularly recurring pulse emissions from a pair of spaced remotely located transmitters comprising a cathode ray tube, a time circuit for generating a train of voltage pulses having a pulse repetition rate equal to the repetition rate of said pulse emissions, a slow sweep generator responsive to said train of pulses to produce a pair of electron beam sweeps on said cathode ray tube, means for receiving said first and second series pulses, a local oscillator, means for mixing said two series of received pulses and the output of said local oscillator to produce pulses at an intermediate frequency, means to rectify said intermediate frequency pulses and to display the pulse envelope of each series of pulses on a separate one of said pair of sweeps, means for generating a series of pedestal pulses and operative to display a pedestal pulse on each of said sweeps, means for adjusting the position of said pedestal pulse on said sweep so that the pulse envelopes of said two series of emission pulses are displayed at the same position on their respective pedestal pulses, a fast sweep generator responsive to each of said pedestal pulses for producing electron beam sweeps on said cathode ray tube of a duration substantially equal to said pedestal pulses, means for substituting said fast sweep generator for said slow sweep generator and for applying said pulses of intermediate frequency directly to said cathode ray indicator for displaying thereon, whereby individual cycles of intermediate frequency energy of said first and second series may be superimposed by adjustment of said pedestal pulse position, and means to energize said local oscillator in a predetermined time relationship to the initiation of said pedestal pulses.

References Cited in the file of this patent
UNITED STATES PATENTS

| | | |
|---|---|---|
| 2,403,429 | Anderson | July 9, 1946 |
| 2,403,600 | Holmes et al. | July 9, 1946 |
| 2,403,626 | Wolff et al. | July 9, 1946 |
| 2,407,287 | Labin | Sept. 10, 1946 |
| 2,423,523 | Shmurak et al. | July 8, 1947 |
| 2,445,361 | Mountjoy et al. | July 20, 1948 |
| 2,513,315 | Hawkins | July 4, 1950 |
| 2,647,257 | Dean | July 28, 1953 |
| 2,728,909 | Palmer | Dec. 27, 1955 |